United States Patent [19]

Chen

[11] Patent Number: 5,274,517
[45] Date of Patent: Dec. 28, 1993

[54] DISK CLAMP WITH ANNULAR SPRING SECTION

[75] Inventor: Kun-Chao C. Chen, Scotts Valley, Calif.

[73] Assignee: Seagate Technology, Inc., Scotts Valley, Calif.

[21] Appl. No.: 942,106

[22] Filed: Sep. 8, 1992

Related U.S. Application Data

[63] Continuation of Ser. No. 809,102, Dec. 11, 1991, abandoned, which is a continuation of Ser. No. 220,328, Jul. 18, 1988, abandoned.

[51] Int. Cl.$^5$ ............................................. G11B 17/02
[52] U.S. Cl. ................................................ 360/98.08
[58] Field of Search ............... 360/98.01, 98.02, 98.08, 360/99.05, 99.12, 97.01, 98.07, 133, 135

[56] References Cited

U.S. PATENT DOCUMENTS

| | | | |
|---|---|---|---|
| 3,670,113 | 6/1972 | Bragas | 360/128 |
| 3,938,192 | 2/1976 | Caletti | 360/98.08 |
| 4,065,799 | 12/1977 | Kaczeus | 360/99.05 |
| 4,561,035 | 12/1985 | McDorman et al. | 360/99.12 |
| 4,639,802 | 1/1987 | Neubauer et al. | 360/98.08 |
| 4,896,231 | 1/1990 | Hoppe | 360/97.02 |

FOREIGN PATENT DOCUMENTS 59-186179  10/1984  Japan ................................ 360/98.02

OTHER PUBLICATIONS

IBM Tech. Discl. Bull., vol. 13, No. 1, Jun. 1970, p. 133, "Magnetic Disk Pack Assembly" by S. Ghose.

Primary Examiner—Robert S. Tupper
Attorney, Agent, or Firm—Flehr, Hohbach, Test, Albritton & Herbert

[57] ABSTRACT

A disc clamp for use within a disc drive to secure a plurality of information storage discs to a spindle hub on a disc drive spindle motor assembly. The disc clamp is secured to the spindle hub by a plurality of hub screws. The disc clamp is fabricated from a single piece of aluminum and includes a substantially flat inner ring section, an outer ring section having a rounded engaging surface and a spring section that couples the inner ring section to the outer ring section. The spring section is thinner than both the inner and outer ring sections. The inner ring section has a plurality of screwholes therein for receiving the hub screws.

4 Claims, 3 Drawing Sheets

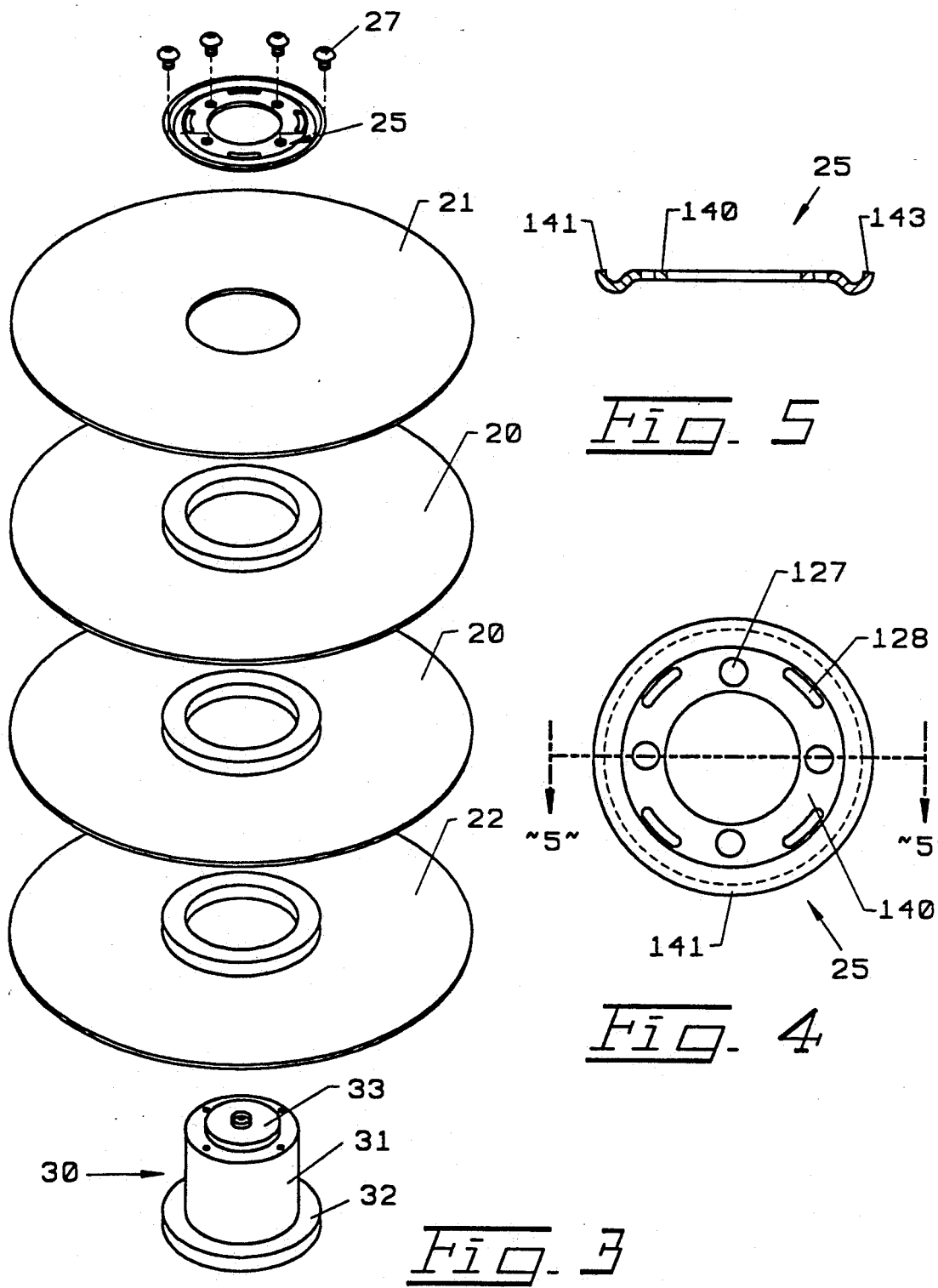

DISK CLAMP WITH ANNULAR SPRING SECTION

This is a continuation of application Ser. No. 07/809,102, filed Dec. 11, 1991, now abandoned, which is a continuation of Ser. No. 07/220,328, filed Jul. 18, 1988, now abandoned.

The present invention relates generally to an improved disc clamp for securing rotational information storage discs within disc drives.

BACKGROUND OF THE INVENTION

Disc drive machines record and reproduce information stored on a recording media. Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned discs. The head positioner assembly are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws.

In practice, the disc clamp design is quite critical to high performance disc drives and there are several design criteria that must be meet in order to provide an effective disc clamp. Specifically, the disc clamp must provide a uniform clamping force along its clamping surface to avoid such problems as top disc distortion. The clamp must also be designed to uniformly distribute its internal stress' in order to minimize clamping force variations due to thermal expansions. Similarly, to facilitate installation and repair of the discs, it is important that resultant stress distribution within the clamp be relatively independent of the sequence in which the clamp screws are attached and the magnitude of the intermediate torques applied during installation.

Another drawback of many prior art disc clamps is that the screws that secure the disc clamp to the spindle hub tend to loosen as a result of thermal cycling of the drive due to stress imbalances within the clamp.

Although several suitable disc clamps have been designed in the past, effective disc clamp designs have traditionally required expensive alloys with high yield strength to accommodate the high stress concentration. However, the use of specialized alloys significantly increases production costs and fabrication complexity.

SUMMARY OF THE INVENTION

Accordingly, it is a primary objective of the present invention to provide a novel disc clamp design that is suitable for fabrication from inexpensive and common materials.

Another object of the invention is to provide a disc clamp design that minimizes stress concentrations and clamping force variations.

To achieve the foregoing and other objects in accordance with the purpose of the present invention, a disc clamp is provided for use within a disc drive to secure a plurality of information storage discs arranged as a disc pack to a spindle hub on a spindle motor assembly disposed within the drive. The disc clamp is secured to the spindle hub by a plurality of hub screws. The disc clamp is fabricated as a single piece that includes a substantially flat inner ring section, an outer ring section having a raised rounded engaging surface and a spring section that couples the inner ring section to the outer ring section. The outer ring is disposed in the same plane as the inner ring, while the spring section extends beneath the plane allowing the rounded convex engaging surface to contact the disc upon installation. The spring section is thinner than both the inner and outer ring sections to provide uniform force distribution about the outer ring. The inner ring section has a plurality of screwholes therein for receiving the hub screws. When installed, only the engaging surface of the outer disc contacts the disc pack and an air space is formed between the spindle hub and the inner ring section.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 3 is an exploded diagrammatic perspective view of the disc pack shown in FIG. 1 highlighting the mounting of the information storage discs to the spindle hub within the casing.

FIG. 4 is a bottom view of the disc clamp shown in FIG. 4.

FIG. 5 is a cutaway side view of a disc clamp fabricated in accordance with the present invention.

DETAILED DESCRIPTION OF THE DRAWINGS

Figure 1:
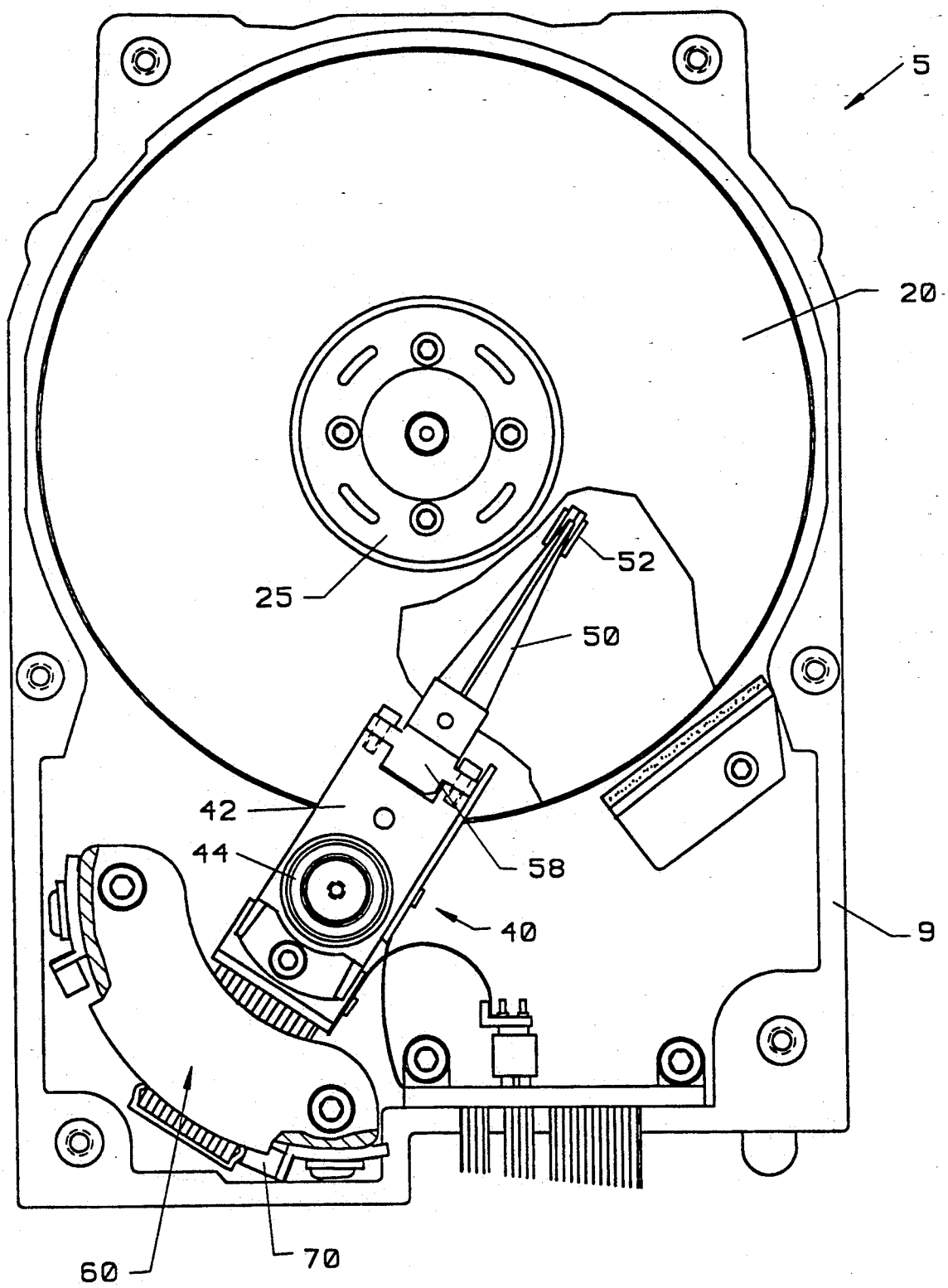
FIG. 1 is a diagrammatic top view of a disc drive that incorporates the present invention with the upper casing removed.
Figure 2:
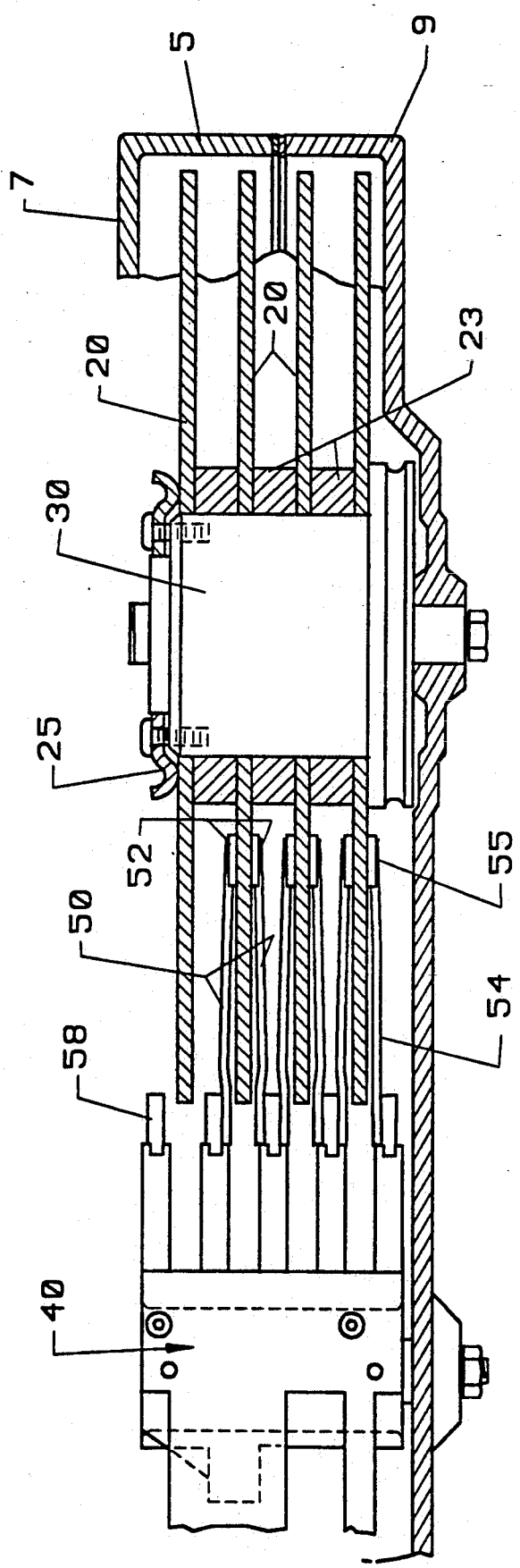
FIG. 2 is a diagrammatic side view of the disc drive shown in FIG. 1.

Referring initially to FIGS. 1 and 2, a disc drive system suitable for incorporating the teachings of the present invention is shown in diagrammatic form. A plurality of information storage discs in the form of magnetic discs 20 are journaled about a spindle motor assembly 30 within a housing 5 having upper and lower casing members 7 and 9 respectively. In the embodiment of the disc drive chosen for the purpose of illustration, four information storage discs 20 are utilized. The storage discs 20 include a top storage disc 21 and a bottom storage disc 22. The spindle motor assembly 30 includes a non-rotating spindle shaft that is securely fastened to the housing 5. A rotatable spindle hub 31 is journaled about the spindle shaft. A plurality of information storage discs are journaled about the spindle hub. Spacers 23 are disposed between adjacent information storage discs 20 and a disc clamp 25, positioned above the top information storage disc 21, firmly secures the magnetic discs 20 to the spindle motor hub 31.

Each information storage disc 20 has a multiplicity of concentric information storage tracks for recording information. A head positioner assembly 40 is rotatably mounted between the upper and lower casing 7, 9 in one corner of the housing 5. The head positioner assembly 40 carries a plurality of flexure arms 50 that each carry a magnetic read/write data head 52 for reading information from and writing information onto the information storage discs 20. The head positioner assembly 40 also supports a servo arm flexure 54 which carries a servo head 55 for accurately positioning the magnetic data heads 52 relative to the information storage tracks. A voice coil motor 60 is adapted to precisely rotate the head positioner assembly back and forth such that the magnetic and servo heads move across the information storage discs. A magnetic latch 70 holds the head positioner assembly in place when the disc drive is not in use.

Referring next to FIG. 3, the spindle hub 31 includes an enlarged spindle base 32. The bottom information storage disc 22 is journaled about the spindle hub 31 and laid on top of the spindle base 32. A spacer 23 which is sized appropriately to be tightly journaled about the spindle hub is then placed over the spindle hub above the bottom information storage disc 22. The remaining information storage discs 20 are then placed over the spindle hub 31 with spacers 23 disposed between adjacent disc pairs. Finally the top information storage disc is placed about the spindle hub 31 and disc clamp 25 is placed over the top of the top information storage disc 21. Disc clamp 25 is then secured to the top portion 33 of spindle hub 31 by a plurality of screws 27.

Referring next to FIGS. 4 and 5, the construction of disc clamp 25 will be described. The clamp disc 25 is annular and concentric about its radial axis. The clamp disc includes an annular central opening 126, and a plurality of equal spaced screw holes 127. In the embodiment shown in FIGS. 4 and 5, four screw holes 127 are provided.

Structurally, the disc clamp includes a substantially flat inner ring 140, an outer ring 141 and a dome-shaped spring section 143 that couples the inner ring to the dome shaped section 143. The dome-shaped spring section 143 is bounded, in the presently preferred embodiment, by its lower convex surface and its upper concave surface that opposes and parallels the convex surface. When installed, the disc clamp will contact the disk at the rounded engaging surface 142 of the dome shaped spring section 143 forming an airspace between the disc clamp and the top portion 33 of the spindle hub. The airspace creates a cushioning effect that minimizes adverse consequences related to the sequence in which the clamp screws are attached to the spindle hub and the magnitude of the intermediate torque applied to each screw during installation.

The inner ring 140 and the outer ring 141 are relatively stiff to provide good load distribution about the disc clamp. The spring section 143 is thinned to a thickness that is somewhat flexible and resilient. The resilient spring section 143 insures a uniform force will be applied about the outer ring and minimizes stress concentrations within the disc clamp. With such a construction, even thermal cycling of the drive will not create significant stress concentrations within the clamp which can induce the screws 27 to loosen. Similarly, thermal expansions and contractions within the disc clamp will not cause significant changes in the load applied to the top disc in terms of either load variations about the clamp or the total force applied to the disc, as would occur if the region occupied by spring section 143 was about the same stiffness as the inner and/or outer rings.

The rounded surface 143 smoothly engages the top disc 21 without presenting any rough edges that can chafe the top disc in the event that the disc clamp moves slightly relative to the top disc 21, as may occur during thermal expansions of the various parts.

The disc clamp may be formed from a single blank by machining the spring section 143 to a specified reduced diameter and stamping the blank into the desired form. Since the stiffness of the spring section may be readily varied, the disc clamp may be fabricated from a wide variety of materials. To minimize adverse thermal effects, the disc clamp 25 is preferably fabricated from the same material as the spindle hub 31. This is typically aluminum. With the design described, any aluminum alloy may be used and importantly, the clamp can be fabricated from inexpensive alloys such as 6061-T6. Another significant advantage of the design described is that it does not require washers for screws 27, thereby reducing material costs and assembly time.

The disc clamp is designed through an iterative design process that begins with the creation of a force-deflection curve and torque-deflection measurements that establish the relationship between the screw-tightening torque and the actual clamping force applied by particular disc clamps. Non-operational shock tests in standard environments may then be performed using an actual drive to determine the minimum screw tightening torque needed to maintain the discs in place without any disc slippage. By way of example, a suitable threshold shock test may be on the order of 120 g's. In parallel, finite element solid models are created and used to calculate and optimize deflection of the various components and maximize principal stress under the minimum clamping force. The properties of the spring portion of the disc clamp are dependent entirely upon the property of the materials selected and care is taken to ensure that the deflections of the inner ring do not exceed the maximum available space between the inner ring and the spindle hub and are low enough to compensate for forced variations due to temperature changes and material creep.

Although only one embodiment of the present invention has been described in detail herein, it should be understood that the present invention may be embodied in many other specific forms without departing from the spirit or scope of the invention. Particularly, it should be appreciated that a wide variety of materials may be used to form the disc clamp. Further, the dimensions of the inner and outer rings, as well as the number of screw holes may be widely varied. Additionally, although the invention has been described in conjunction with its application to a particular Winchester-type disc drive, it should be appreciated that the disc clamp design described may be applicable to a wide variety of information storage devices having widely varying designs of their other components. Therefore, the present examples and embodiments are to be considered as illustrative and not restrictive, and the invention is not to be limited to the details given herein, but may be modified within the scope of the appended claims.

What is claimed is:

1. A disc clamp for securing a plurality of information storage discs to a spindle hub on a disc drive spindle motor assembly, the disc clamp fabricated from a single piece and comprising:
- a substantially flat inner ring section having a plurality of screw holes for receiving screws that couple said disc clamp to the spindle hub;
- an annular outer ring section, said outer ring disposed in he same plane as said inner ring;
- an annular domed spring section that couples the inner ring section to the outer ring section, said spring section extending beneath the plane of said inner and outer ring sections, the spring section having a top and bottom surface, said bottom surface a continuous rounded convex surface suitable for contact with an information storage disc, said spring section thinner than said inner and outer ring section thereby reducing the stiffness of said spring section as compared to said inner and outer ring section, said rounded convex surface directly touching a surface of a top information storage disc and applying a downward pressure against the surface of the top information storage disc; and
- whereby the disc clamp is supported by said rounded convex surface when installed on the disc drive and an airspace is formed between the spindle hub and the inner ring section.

2. The disc clam of claim 1, wherein said spring section having a top surface, said top surface having a continuous concave surface opposing said rounded convex surface.

3. A disc drive system comprising:
- a spindle hub having a longitudinal axis;
- means for rotating said spindle hub about its longitudinal axis;
- a plurality of information storage discs jounaled about said spindle hub in spaced apart, vertically aligned relation, said information storage discs being coupled to said spindle hub to rotate with the spindle hub;
- a plurality of magnetic transducer heads for writing information onto the information storage discs and for reading information out from the information storage discs;
- a head positioner assembly for positioning the transducers heads relative to the information storage discs;
- a disc clamp for securing the information storage discs to the spindle hub on a disc drive spindle motor assembly, the disc clamp being fabricated form a single piece and including:
- a substantially flat inner ring section having plurality of screw holes for receiving screws that couple said disc clamp to the spindle hub;
- an annular outer ring section, said outer ring disposed in the same plane as said inner ring; and
- an annular domed spring section that couples the inner ring section to the outer ring section, said spring section extending beneath the plane of said inner and outer ring sections, the spring section having a top and bottom surface, said bottom surface a continuous rounded convex surface suitable for contact with an information storage disc, said spring section thinner than said inner and outer ring section thereby reducing the stiffness of said spring section as compared to said inner and outer ring section, said rounded convex surface directly touching a surface of a top information storage disc and applying a downward pressure against the surface of the top information storage disc.

4. The drive system of claim 3, wherein said spring section having a top surface, said top surface having a continuous concave surface opposing said rounded convex surface.

* * * * *